(12) United States Patent
Mummigatti et al.

(10) Patent No.: US 11,695,174 B2
(45) Date of Patent: Jul. 4, 2023

(54) BATTERY-CELL TAB DIRECT COOLING USING A MULTI-MATERIAL COOLING MODULE

(71) Applicant: GM GLOBAL TECHNOLOGY OPERATIONS LLC, Detroit, MI (US)

(72) Inventors: Mahesh A. Mummigatti, Nimbekaipura (IN); Tejas R. Bhavsar, Troy, MI (US); Pablo Valencia, Jr., Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 16/515,686

(22) Filed: Jul. 18, 2019

(65) Prior Publication Data

US 2021/0021008 A1    Jan. 21, 2021

(51) Int. Cl.
*H01M 10/6568* (2014.01)
*H01M 10/647* (2014.01)
*H01M 10/613* (2014.01)
*H01M 10/625* (2014.01)
(Continued)

(52) U.S. Cl.
CPC ... *H01M 10/6568* (2015.04); *H01M 10/0481* (2013.01); *H01M 10/613* (2015.04); *H01M 10/625* (2015.04); *H01M 10/647* (2015.04); *H01M 10/653* (2015.04); *H01M 10/6555* (2015.04); *H01M 10/6556* (2015.04); *H01M 50/147* (2021.01); *H01M 50/20* (2021.01);
(Continued)

(58) Field of Classification Search
None
See application file for complete search history.

(56) References Cited

U.S. PATENT DOCUMENTS 3,795,422 A * 3/1974 Robinson ........... B64D 11/0007
297/146
2007/0275298 A1* 11/2007 Igoris .................. H01M 50/325
429/62
(Continued)

FOREIGN PATENT DOCUMENTS

| CN | 1367078 A | 9/2002 |
| CN | 1441191 A | 9/2003 |
| CN | 207038660 U | 2/2018 |

OTHER PUBLICATIONS

Industrial Laser Solutions, Laser joining of metal and plastic, Nov. 1, 2010 (Year: 2010).*

*Primary Examiner* — Ula C Ruddock
*Assistant Examiner* — Mary Grace Byram
(74) *Attorney, Agent, or Firm* — Quinn IP Law

(57) ABSTRACT

Systems, methods and a cooling module are described. The cooling module is configured to directly cool the plurality of battery cell tabs. The cooling module includes a generally prismatic isolation sheet contacting the battery cell tabs along a common plane and a heat exchanger. The heat exchanger includes a metallic portion defining an open cavity and a lightweight portion joined to the metallic portion to define a unitary flow assembly. The metallic portion includes an outer planar surface engaging the second planar surface. The lightweight portion is formed from a thermally conductive plastic material and includes baffles integrally formed with and extending therefrom. The plurality of baffles engage an interior surface of the metallic portion to thereby define a serpentine path for the cooling fluid.

20 Claims, 5 Drawing Sheets

(51) Int. Cl.
  *H01M 10/04* (2006.01)
  *H01M 10/6555* (2014.01)
  *H01M 10/6556* (2014.01)
  *H01M 10/653* (2014.01)
  *H01M 50/20* (2021.01)
  *H01M 50/147* (2021.01)
  *B60L 50/64* (2019.01)
  *H01M 10/6551* (2014.01)
  *H01M 50/249* (2021.01)
  *H01M 50/271* (2021.01)
  *H01M 50/211* (2021.01)

(52) U.S. Cl.
  CPC .......... *B60L 50/64* (2019.02); *H01M 10/6551* (2015.04); *H01M 50/211* (2021.01); *H01M 50/249* (2021.01); *H01M 50/271* (2021.01); *H01M 2220/20* (2013.01)

(56) References Cited

U.S. PATENT DOCUMENTS

| | | | |
|---|---|---|---|
| 2008/0014482 A1* | 1/2008 | Yamamiya | H01M 8/04074 348/E5.025 |
| 2008/0292948 A1* | 11/2008 | Kumar | H01M 10/615 429/120 |
| 2011/0157774 A1* | 6/2011 | Aitchison | H01M 50/24 361/502 |
| 2013/0014923 A1* | 1/2013 | Girmscheid | H01M 10/625 165/168 |
| 2013/0045409 A1* | 2/2013 | Schroeter | H01M 10/6561 429/120 |
| 2014/0113172 A1* | 4/2014 | Enghardt | H01M 50/10 429/163 |
| 2018/0159096 A1* | 6/2018 | Kim | H01M 10/0525 |
| 2018/0212289 A1* | 7/2018 | Pinon | H01M 50/20 |
| 2019/0109357 A1 | 4/2019 | Kenney | |

* cited by examiner

BATTERY-CELL TAB DIRECT COOLING USING A MULTI-MATERIAL COOLING MODULE

INTRODUCTION

The disclosure relates to the field of battery modules and, more specifically, to systems and methods for directly cooling battery-cell tabs using a multi-material cooling module.

Vehicles may include batteries for propulsion. For instance, hybrid electric vehicles (HEVs) and purely electric vehicles (EVs) include batteries. These batteries can passively store electrical energy. The flow of electric current to and from the individual cells (i.e., a single electrochemical unit) is such that when several such cells are combined into successively larger assemblies (such as modules and packs), the current or voltage can be increased to generate the desired power output. In the present context, larger module and pack assemblies are made up of one or more cells joined in series (for increased voltage), parallel (for increased current) or both, and may include additional structure to ensure proper installation and operation of these cells. Use of such battery cells for propulsion continually generates heat, which is preferably removed from the battery cells

SUMMARY

It is desirable to directly cool battery-cell tabs. Beneficially, multi-material cooling modules described herein provide a lightweight cooling module with a high thermal conductivity between the battery-cell tabs and a heat exchanger. The cooling modules as described herein contribute to longevity of the battery pack and inhibit presence of thermal runaway.

According to aspects of the present disclosure, a cooling module includes an isolation sheet and a heat exchanger. The isolation sheet is generally prismatic with a first planar surface opposite a second planar surface. The first planar surface is configured to contact a plurality of battery cell tabs. The heat exchanger includes a metallic portion and a lightweight portion. The metallic portion defines an open cavity and includes an outer planar surface engaging the second planar surface. The lightweight portion is joined to the metallic portion to define a unitary flow assembly. The lightweight portion is formed from a thermally conductive plastic material. The lightweight portion including a plurality of baffles extending therefrom. The plurality of baffles is integrally formed with the lightweight portion. The plurality of baffles engages an interior surface of the metallic portion to thereby define a serpentine path for the cooling fluid.

According to further aspects of the present disclosure, the isolation sheet is formed from mica.

According to further aspects of the present disclosure, the plurality of baffles includes a first baffle, a second baffle, and a third baffle each extending laterally through a center of the cavity. Each of the first baffle, the second baffle, and the third baffle allow cooling fluid to pass through gaps between both ends of the respective baffle and lateral walls of the heat exchanger corresponding to the respective baffle. The first baffle is disposed adjacent to the coolant inlet. The second baffle and the third baffle are disposed adjacent to the coolant outlet.

According to further aspects of the present disclosure, a cooling-fluid inlet nozzle and a cooling-fluid outlet nozzle are disposed perpendicular to a longitudinal axis of the heat exchanger.

According to further aspects of the present disclosure, the plurality of baffles provides structural support to the outer planar surface of the metallic portion.

According to further aspects of the present disclosure, the plurality of baffles includes a plurality of metallic members therein.

According to further aspects of the present disclosure, each of the metallic members compressively engages the metallic portion to form a thermal bridge therebetween.

According to further aspects of the present disclosure, the plurality of baffles includes a first set of baffles proximate to a cooling-fluid inlet and a second set of baffles proximate to the cooling-fluid outlet, and wherein the first set lacks metallic members and the second set includes the plurality of metallic members.

According to further aspects of the present disclosure, the plurality of baffles includes the plurality of baffles includes a first set of baffles proximate to a cooling-fluid inlet, a second set of baffles proximate to the cooling-fluid outlet, and a third set of baffles disposed therebetween, and wherein the first set of baffles lacks metallic members, each of the third set of baffles includes a respective metallic member having a first area exposed to cooling fluid, and each of the second set of baffles includes a respective metallic member having a second area exposed to cooling fluid, the second area being greater than the first area.

According to aspects of the present disclosure, a battery module includes a battery pack, a plurality of battery cell tabs, and a cooling module configured to directly cool the plurality of battery cell tabs. The battery pack includes a plurality of battery pouches. Each of the battery pouches including a respective battery cell tab extending from an end thereof. The plurality of battery cell tabs defines a common plane. The cooling module includes an isolation sheet and a heat exchanger. The isolation sheet is generally prismatic with a first planar surface opposite a second planar surface, the first planar surface contacting the plurality of battery cell tabs along the common plane. The heat exchanger includes a metallic portion and a lightweight portion. The metallic portion defines an open cavity. The metallic portion includes an outer planar surface engaging the second planar surface. The lightweight portion is joined to the metallic portion to define a unitary flow assembly. The lightweight portion is formed from a thermally conductive plastic material. The lightweight portion includes a plurality of baffles extending therefrom. Each of the plurality of baffles is integrally formed with the lightweight portion. The plurality of baffles engage an interior surface of the metallic portion to thereby define a serpentine path for the cooling fluid.

According to further aspects of the present disclosure, the isolation sheet is formed from mica.

According to further aspects of the present disclosure, the plurality of baffles includes a plurality of metallic members therein.

According to further aspects of the present disclosure, each of the metallic members compressively engages the metallic portion to form a thermal bridge therebetween.

According to further aspects of the present disclosure, the plurality of baffles includes a first set of baffles proximate to a cooling-fluid inlet and a second set of baffles proximate to the cooling-fluid outlet, and wherein the first set lacks metallic members and the second set includes the plurality of metallic members.

According to further aspects of the present disclosure, each battery cell tab includes a first portion extending through an interconnect board and a second portion at a convex angle to the first portion, the second portion being supported by the interconnect board, and wherein the cooling module compressively engages the second portion of the battery cell tabs and the interconnect board.

According to further aspects of the present disclosure, the battery module further includes an ICB cover defining an open cavity having the cooling module therein. The ICB cover is configured to inhibit movement of the cooling module along two axes. The ICB cover is further configured to, upon a fastening engagement with the interconnect board, apply compressive force between the cooling module and the plurality of battery cell tabs.

According to further aspects of the present disclosure, movement of the cooling module along the two axes is inhibited by a friction fit between the cooling module and the ICB cover.

According to further aspects of the present disclosure, the ICB cover includes a plurality of indentations configured to inhibit movement of the cooling module along a first axis of the two axes.

According to further aspects of the present disclosure, the indentations are further configured to receive a fastener therethrough to secure the ICB cover to the interconnect board.

According to further aspects of the present disclosure, the fastener is a protrusion that is integrally formed with the interconnect board.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and are shown in the accompanying drawings in which:

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description.

As used herein, the term "module" refers to hardware, software, firmware, electronic control component, processing logic, and/or processor device, individually or in a combination thereof, including without limitation: an application specific integrated circuit (ASIC), an electronic circuit, a processor (shared, dedicated, or group) and memory that executes one or more software or firmware programs, a combinational logic circuit, and/or other components that provide the described functionality.

Embodiments of the present disclosure may be described herein in terms of functional and/or logical block components and various processing steps. It should be appreciated that such block components may be realized by one or more hardware, software, and/or firmware components configured to perform the specified functions. For example, embodiments of the present disclosure may employ various integrated circuit components (e.g., memory elements, digital signal processing elements, logic elements, look-up tables, or the like), which may carry out a variety of functions under the control of one or more microprocessors or other control devices. In addition, those skilled in the art will appreciate that embodiments of the present disclosure may be practiced in conjunction with one or more systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
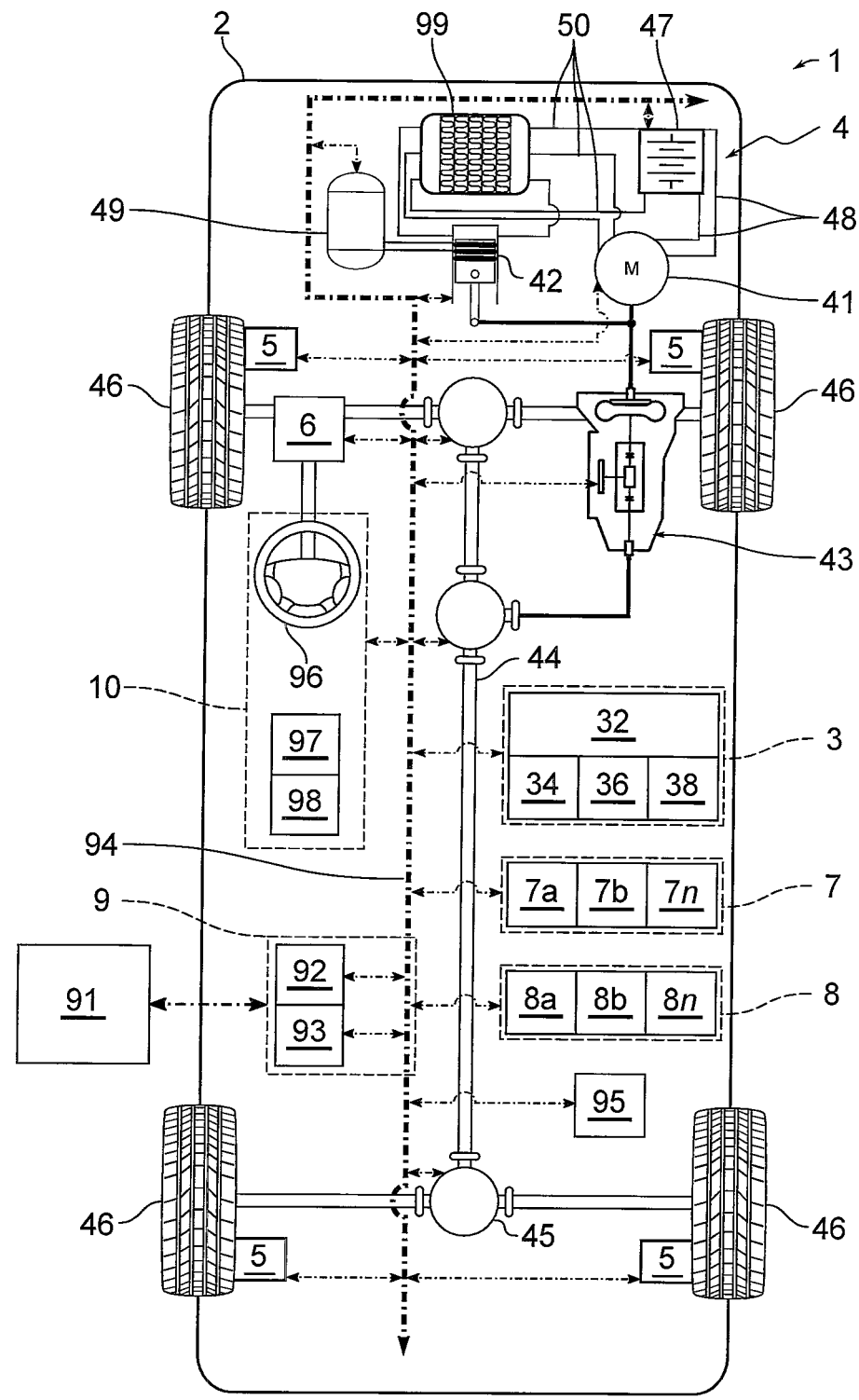
FIG. 1 is a schematic illustration of vehicle, according to aspects of the present disclosure.

FIG. 1 illustrates vehicle 1 according to aspects of the present disclosure The vehicle 1 generally includes a body 2, a vehicle control system 3, a powerplant 4, a braking system 5, a steering system 6, a sensor system 7, an actuator system 8, a communication system 9, and one or more human-machine interfaces 10. The body 2 is arranged on a chassis and substantially encloses components of the vehicle 1. The body 2 and the chassis may jointly form a frame.

The control system 3 is configured to control at least one vehicle function via receiving, processing, and sending signals between vehicle components. The vehicle control system 3 includes a controller 32 with at least one processor 34, at least one computer-readable storage medium 36, and at least one signal input-output interface 38. The control system 3 is, or may include, one or more powertrain, engine, transmission, braking, steering, and/or suspension control modules, central control modules, and the like.

The processor 34 may be a custom-made or commercially available processor, a central processing unit (CPU), a graphics processing unit (GPU), an auxiliary processor among several processors associated with the controller 32, a semiconductor-based microprocessor (in the form of a microchip or chip set), a macroprocessor, a combination thereof, or generally a device for executing instructions.

The computer-readable storage medium 36 may include volatile and nonvolatile storage in read-only memory (ROM), random-access memory (RAM), and keep-alive memory (KAM), for example. KAM is a persistent or non-volatile memory that may be used to store various operating variables while the processor 34 is powered down. The computer-readable storage medium 36 may be implemented using a number of suitable memory devices such as programmable read-only memory (PROM), electrically PROM (EPROM), electrically erasable PROM (EEPROM), flash memory, or other electric, magnetic, optical, or combination memory devices capable of storing data, some of which represent executable instructions, used by the controller 32 in controlling the vehicle 1.

The executable instructions may include one or more separate programs, each of which comprises an ordered listing of executable instructions for implementing logical functions. The executable instructions, when executed by the processor 34, receive and process signals from the sensor system 7, perform logic, calculations, methods and/or algorithms for automatically controlling the components of the vehicle 1, and generate control signals to the actuator system 8 to automatically control the components of the vehicle 1 based on the logic, calculations, methods, and/or algorithms. Although a single controller 32 is shown in FIG. 1, embodiments of the vehicle 1 may include a number of controllers 32 that communicate over a suitable communication medium or a combination of communication media and that cooperate to process the sensor signals, perform logic, calculations, methods, and/or algorithms, and generate control signals to automatically control features of the vehicle 1. In some aspects, one or more executable instructions of the controller 32 are embodied in the vehicle control system 3.

The powerplant 4 is configured to generate power and propel the vehicle 1. The powerplant 4 includes at least one motor 41 and/or engine 42, a transmission 43, driveshafts 44, differentials 45, and a final drive such as wheels 46.

The motor 41 is an electric machine, such as a motor-generator unit. The motor 41 is electrically coupled to a battery module 47 via conductors 48. The battery module 47 is configured to store electrical energy and to provide electrical energy to the powerplant 4 and/or other components of the vehicle 1 The battery module 47 may be supplied with electrical energy from a source external to the vehicle 1 (e.g., a municipal power grid) or a source internal to the vehicle, such as the motor 41 (e.g., via regenerative braking), an alternator, a fuel cell stack, combinations thereof, and the like.

The engine 42 is a heat engine, such as an internal combustion engine. The engine 42 is fluidically coupled to a fuel tank 49 via at least one fluid conduit 50. The engine 42 may be coupled to the motor 41 in parallel or series configurations. For example, the engine 42 and motor 41 may be coupled in a P0-P4 configuration, power-split configuration, and the like.

The transmission 43 is configured to provide controlled application of power or torque received from the motor 41 and/or engine 42 to the downstream components of the powerplant 4 according to selectable speed ratios. For example, the transmission 43 may include a step-ratio automatic transmission, a continuously-variable transmission, a manual transmission, or other appropriate transmission.

The driveshafts 44 are configured to transmit torque and rotation between various components of the powerplant 4 which are not directly coupled.

The differentials 45 are configured to distribute received torque and rotation between the outputs. In some aspects, the differentials 45 include, for example, axel differentials and a transfer case.

The wheels 46 are each rotationally coupled to the chassis near a respective corner of the body 2. The wheels 46 are configured to engage a surface, and at least one of the wheels is configured to rotate in response to receiving power or torque from the transmission 43 to thereby propel the vehicle 1

The braking system 5 is configured to provide braking torque to the wheels 46. The braking system 5 may include, for example, friction brakes, brake by wire, a regenerative braking system such as an electric machine, and/or other appropriate braking systems. The braking system 5 includes one or more brake actuators (e.g., brake calipers) coupled to one or more wheels 46 such that, upon actuation, the brake actuators apply braking pressure to one or more of the wheels 46 by, for example, engaging a respective brake rotor.

The steering system 6 is configured to influence a trajectory or path of the vehicle 1. For example, the steering system may alter a position of the vehicle wheels 46. While depicted as including a steering wheel 46 for illustrative purposes, in some embodiments contemplated within the scope of the present disclosure, the steering system 6 may not include a steering wheel 46.

The sensor system 7 includes one or more sensors 7a, 7b, 7n (i.e., sensing devices) that sense observable conditions of the exterior and/or the interior of the vehicle 1. The sensors 7a, 7b, 7n are in communication with the controller 32 and may include, but are not limited to, one or more accelerometers (e.g., gyroscopes), one or more radio detection and ranging (RADAR) devices, one or more light detection and ranging (LIDAR) devices, one or more global positioning system (GPS) devices, one or more image capture devices 7a (e.g., optical cameras and/or thermal cameras), ultrasonic devices, one or more inertial measurement units 7b, speed sensing devices, pressure sensing devices, temperature sensing devices 7n, humidity sensing devices, voltage sensing devices, current sensing devices, resistance sensing devices, airflow sensing devices, gas sensing devices, actuation sensing devices, and/or other sensing devices.

The actuator system 8 includes one or more actuator devices 8a, 8b, 8n that control one or more vehicle features such as, but not limited to, the motor 41, the engine 42, the transmission 43, the braking system 5, and the steering system 6. The actuators 8a, 8b, 8n are in communication with the control system 3 and may include, but are not limited to, binary actuators (e.g., solenoids), multi-state actuators (e.g., stepper motors), or infinitely positionable actuators (e.g., linear actuators). Further, the actuators 8a, 8b, 8n may be hydraulic actuators, pneumatic actuators, electric actuators, thermal actuators, magnetic actuators, mechanical actuators, combinations thereof, and the like.

The communication system 9 is configured to communicate information, wirelessly and/or by wire, to and from vehicle components and/or other entities 91. The communication system 9 may include an internal communication management module 92, an external communication management module 93, and a bus 94.

The bus 94 is configured to carry signals and/or data between various components of the vehicle 1. In some aspects, the bus 94 is a controller area network (CAN) bus 94. The internal communication management module 92 is configured to manage and/or coordinate signaling between vehicle components via the bus 94.

The external communication management module 93 is configured to manage and/or coordinate signaling between the vehicle 1 or components thereof and other entities 91. The other entities 91 may be, for example, other vehicles ("V2V" communication), infrastructure ("V2I" communication), remote systems (e.g., internet-based communication), and/or personal devices (e.g., a cellular telephone). In some aspects, external communication management module 93 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 9 may include one or more antennas and/or transceivers for receiving and/or transmitting signals, such as cooperative sensing messages (CSMs). In some aspects, the external communication management module 93 is directly connected to the bus 94, while in some further aspects, the external communications management module 93 is coupled to the bus 94 via, for example, the internal communication management module 92.

The data-storage device 95 stores data pertaining to the vehicle 1, such as data for use in operating and/or diagnosing conditions of the vehicle 1 or components thereof. As can be appreciated, the data-storage device 95 may be part of the controller 32, separate from the controller 32, or both part of the controller 32 and part of a separate system.

The human-machine interface 10 (or optionally referred to as a user interface) is configured to provide an input and/or output interface between the vehicle 1 and one or more humans. The human-machine interface 10 may include, for example, one or more operator input/output devices 96, illustrated notionally as a steering wheel, passenger input/output devices 97, and/or service input/output devices 98.

Operator input/output devices 96 are configured to receive input and/or provide output to an operator of the vehicle 1. Operator input/output devices 96 may include, for example, mechanical and/or electronic devices.

The mechanical devices configured to change physical states or placement in space in response to interaction or actuation. Such mechanical devices may include may include a steering wheel, button, or switch. For example, the steering wheel may be rotated in response to an altered trajectory of the vehicle 1 by the operator or in response to a force acting on the front wheels 46.

The electronic devices are configured to change electronic states or illumination in response to interaction or actuation. Such electronic devices may include a display, indicator light, touchscreen, or personal device. For example, upon determination of a diagnostic condition (e.g., a component overtemperature condition), an indicator light may be actuated to indicate the presence of the condition and thereby inhibit achieving more advanced conditions by providing information needed to mitigate (e.g., reduction of an operating condition) or eliminate the condition (e.g., component repair or cessation of the operating condition).

The vehicle 1 further comprises a heat-exchange system 99, shown notionally as a radiator. The heat-exchange system 99 is configured to alter the temperature of vehicle components. The heat-exchange system 99 may be configured to increase and/or decrease the temperature of one or more vehicle components such as motor-generator unit 41, engine 42, battery pack 47, fuel storage tank 49, a vehicle cabin, and the like. The heat-exchange system 99 is coupled to at least one respective component through fluid conduits 50 that are configured to convey a fluid therethrough.

Figure 2:
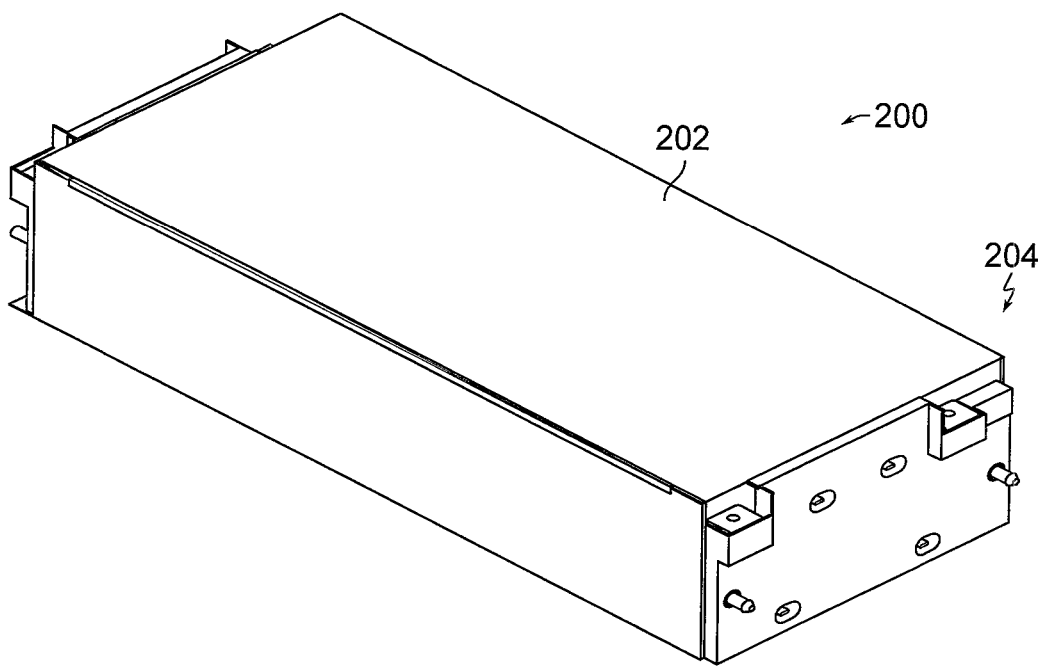
FIG. 2 is a schematic view of a battery module, according to aspects of the present disclosure.

FIG. 2 illustrates a battery module 200. The battery module 200 includes a battery pack 500 (discussed in more detail with reference to FIG. 5, below) disposed within a housing 202. One or more ends 204 of the battery module 200 include an interconnect board 302, a cooling module 304, and an interconnect board (ICB) cover 306, as are illustrated FIG. 3.

Figure 3:
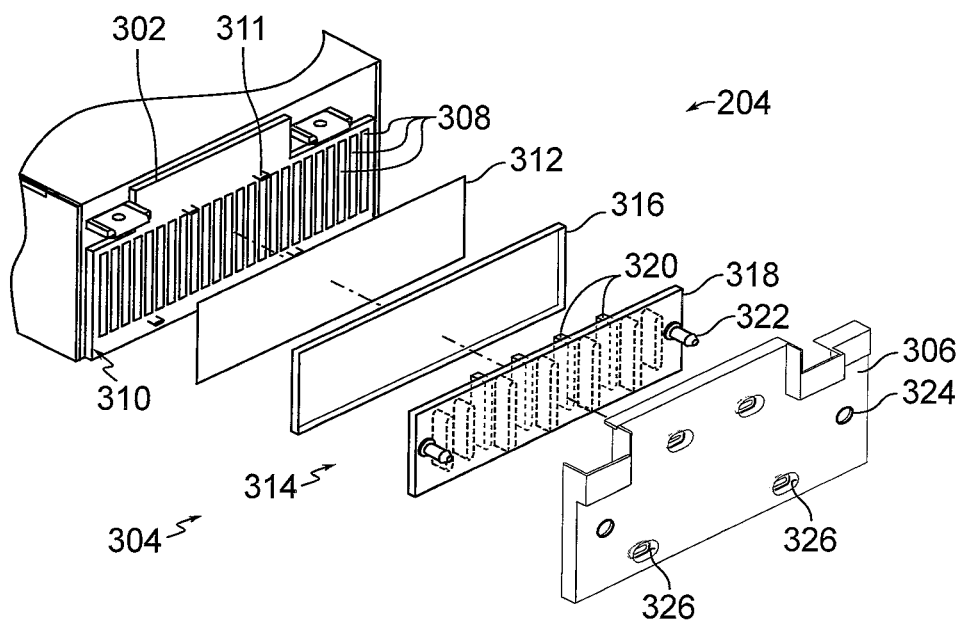
FIG. 3 is a schematic exploded view of an end of the battery module of FIG. 2.
Figure 5:
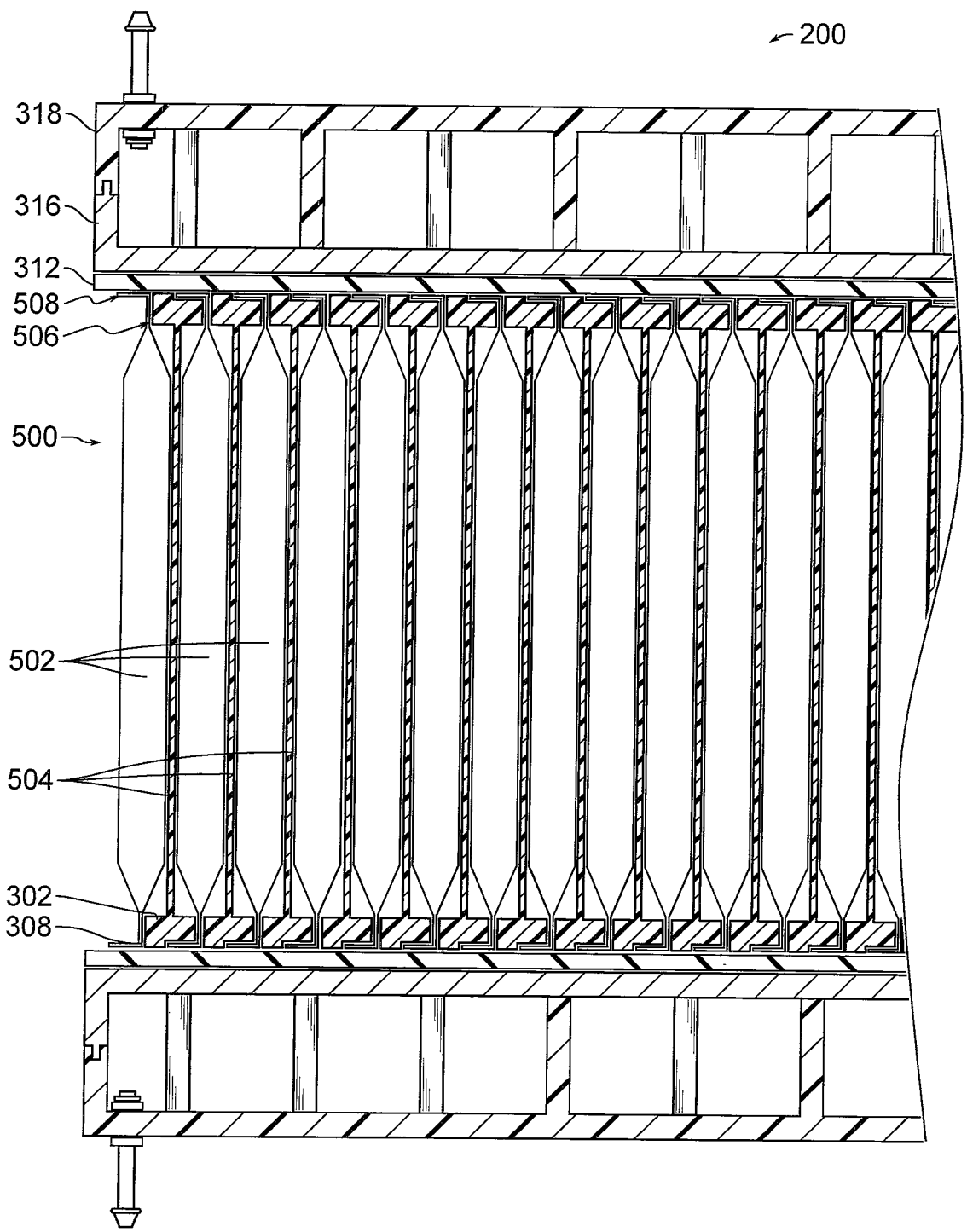
FIG. 5 is a cross-sectional view the battery module of FIG. 2.

FIG. 3 illustrates an exploded view of an end 204 of the battery module 200. The end 204 includes an interconnect board 302, a cooling module 304, and an ICB cover 306. The interconnect board 302 is configured to provide structural rigidity to a plurality of battery cell tabs 308 extending therethrough. Each of the battery cell tabs 308 is connected to a respective cell pouch 502 within the battery pack 500 (FIG. 5). While the illustrated embodiment includes a unipolar tab configuration, e.g., positive tabs 308 at the first end 204 of the battery module 200 and negative tabs 308 at the opposite end of the battery module 200, it is contemplated that both positive and negative tabs 308 for each pouch 502 may be disposed at a single end of the battery module 200.

The interconnect board 302 may be generally prismatic with a plurality of channels correspondingly shaped to the battery tabs 308 and configured to receive the battery tabs 308 therein such that the battery tabs 308 are generally aligned with a planar surface 310 of the interconnect board 302. The interconnect board 302 may be formed from a non-conductive material, such as molded plastic, and may further include conductors, fuses, and the like to create desired circuits for coupling the battery tabs 308 to other components of the vehicle 1. In some aspects, the interconnect board 302 further includes a plurality of protrusions 311 configured to assist in alignment and attachment of the ICB cover 306 to the first end 204 of the battery module 200. For example, the protrusions may be arranged such that the ICB cover 306 is attachable to the battery module 200 in a single orientation. Further, the protrusions 311 may include a rotatable portion at an end thereof that is passed through an aperture of the ICB cover 306 in a first orientation, then rotated to a second orientation that engages an outer surface of the ICB cover 306 to thereby hold the ICB cover 306 in place.

The cooling module 304 includes an isolation sheet 312 and a heat exchanger 314. The isolation sheet 312 is configured to electrically isolate the battery tabs 308 from the heat exchanger 314 while still being thermally conductive. As used herein, the term "isolation sheet" refers to a sheet of material that provides electrical insulation between a first planar surface and a second planar surface thereof. The isolation sheet 312 is a prismatic sheet of material extending across and contacting each of the cell tabs 308. In some aspects, the isolation sheet 312 is mica. As used herein, "thermally conductive" is used to indicate a thermal conductivity of at least 0.3 $Wm^{-1}K^{-1}$. In some aspects, the thermal conductivity is 0.71 $Wm^{-1}K^{-1}$. Because the interface between the isolation sheet 312 and heat exchanger 314 is planar along substantially the entirety of the isolation sheet 312, the isolation sheet 312 is structurally supported by the heat exchanger 314. Beneficially, the thickness of the isolation sheet 312 may be optimized to provide electrical isolation at the operating temperatures and voltage while reducing weight and increasing heat transfer through the isolation sheet 312. In some aspects, the thickness of the isolation sheet 312 is less than 0.5 mm.

The heat exchanger 314 is a multimaterial, unitary flow assembly including a metallic portion 316 and a lightweight portion 318 defining a coolant channel therebetween. Beneficially, the multimaterial, unitary flow assembly of the heat exchanger 314 lacks an adhesive to thereby optimize longevity of the heat exchanger 314 and inhibits potential shorting or degraded cooling as a result of a cooling fluid leak. The metallic portion 316 and the lightweight portion 318 may be made unitary using laser-assisted metal and plastic ("LAMP") joining to directly bond the elements of the heat exchanger 314. Beneficially, the rapid expansion from vapor bubbles in the molten plastic drives plastic flow into surface imperfections of the metallic portion 316 without melting the metal at the lap joint. In some aspects, electromagnetic induction heating is used.

The metallic portion 316 is configured to optimize thermal conductivity of the heat exchanger 314. The metallic portion defines an open cavity and contacts the isolation sheet 312 to thereby optimize the temperature difference across the thickness of the isolation sheet 312. In some aspects, the metallic portion 316 is formed from aluminum.

The lightweight portion 318 is directly bonded to the metallic portion 316 to form a hermetic seal therebetween. The lightweight portion 318 is configured to reduce the overall weight of the cooling module 304. The lightweight portion 318 is formed from a thermally conductive plastic material to thereby reduce weight of the heat exchanger 314 while providing a desired heat transfer to cooling fluid passed through the heat exchanger 314. The thermally conductive plastic material may be, for example, a plastic material having a thermal conductivity of at least 16 $Wm^{-1}K^{-1}$. In some aspects, the thermally conductive plastic material is a polyamide, polycarbonate, or polyphenylene sulfide. Example polyamides include COOLPOLY E3609, available from the Celanese Corporation (Irving, Tex.), TECACOMP PA66 TC white 4040, available from Ensinger GmbH (Nufringen, Germany), or PX10323, available from SABIC (Riyadh, Saudi Arabia). Example polycarbonates include DTK22, available from SABIC (Riyadh, Saudi Arabia). Example polyphenylene sulfides include COOL-POLY D5120, available from the Celanese Corporation (Irving, Tex.).

The lightweight portion 318 includes baffles 320 extending therefrom and toward the metallic portion 316. The baffles 320 are integrally formed with the lightweight portion 318. The baffles 320 are configured to optimize a path of the cooling fluid through the heat exchanger 314. The baffles 320 may be further configured to promote turbulent mixing of the cooling fluid. The baffles 320 direct the cooling fluid along a generally serpentine path to help optimize heat transfer through the heat exchanger 314. Beneficially, forming the baffles 320 from the material of the lightweight portion 318 optimizes manufacturing by providing for baffle 320 formation in a single process, such as molding.

To provide the serpentine path, a first of the baffles 320 abuts a first wall of the heat exchanger 314 and extends laterally toward, but does not contact, the second wall of the heat exchanger 314 opposite the first wall, while at least one of the adjacent baffles 320 abuts the second wall and extends laterally toward, but does not contact, the first wall. Non-abutting lateral ends of the baffles 320 may be generally curved or smoothed to optimize flow and inhibit formation of eddy currents as the fluid flow changes direction. Further, the non-abutting ends may include extensions to further increase mixing and path length. For example, the baffles may be T-shaped such that perpendicular extensions of adjacent baffles are spaced apart from each other across the longitudinal axis of the heat exchanger 314 and overlap for a distance along the longitudinal axis.

As can be seen in the illustrated embodiment, the cooling-fluid inlet and outlet nozzles 322 are disposed perpendicular to a longitudinal axis of the heat exchanger 314. The baffles 320 nearest these nozzles 322 extend laterally through a center of the cavity and allow cooling fluid to pass through gaps between the baffles 320 and both the first wall and the second wall adjacent to the respective baffle 320. Beneficially, such a configuration allows for the nozzles 322 to be disposed perpendicularly to the longitudinal axis while reducing or eliminating flow dead zones to thereby increase the effective surface area of the heat exchanger 314.

In some aspects, the baffles 320 are further configured to selectively increase mean residence time in portions of the heat exchanger 314 near an outlet relative to the mean residence time in portions of the heat exchanger upstream therefrom. For example, two or more of the baffles 320 adjacent to the outlet nozzle 322 may include two non-abutting ends, as shown in FIG. 3, such that the mean residence time of the cooling fluid in the volume of the heat exchanger 314 near the outlet nozzle 322 is greater than the mean residence time of the cooling fluid in the volume of the heat exchanger 314 through the serpentine path. Beneficially, such a configuration reduces the difference in temperature ($\Delta T$) between the battery cell tabs 308 corresponding to the inlet of the heat exchanger 314 and battery cell tabs 308 corresponding to the outlet of the heat exchanger 314 without increasing flow rates or pressures of the cooling fluid.

The baffles 320 engage the planar surface of the metallic portion 316. The baffles are configured to provide structural support across the planar surface of the metallic portion 316 and the isolation sheet 312 to thereby minimize the thicknesses of each. Beneficially, minimizing the thickness of the isolation sheet 312 improves conductivity of the cooling module 304 by reducing thermal resistance between the battery cell tabs 308 and the cooling fluid. Further, minimizing the thickness of the planar surface of the metallic portion 316 reduces overall weight of the cooling module 304 and thereby optimize efficiency of the vehicle 1. Additionally, intimate contact of the baffles 320 with the metallic portion 316 increases thermal transmission through the cooling module 304 by allowing the baffles 320 to act as cooling fins for the metallic portion 316 while being formed by a lightweight material. In some aspects, an engaging end of the baffles 320 may be radiused or convex such that the engaging end may deflect to conform and apply generally even pressure to the metallic portion 316. The nozzles 322 are configured to be coupled to a respective fluid conduit 50. In some aspects, the nozzles 322 are integrally formed with the lightweight portion 318. In some aspects, the nozzles 322 are separately formed and extend through a respective aperture in the exterior surface of the lightweight portion 318.

The ICB cover 306 is configured to provide a protective cover for components at the end 204. The ICB cover 306 includes apertures 324 which are configured to receive a respective nozzle 322 therethrough. The nozzles 322 may include a shoulder or a tapered base to align and engage an inner wall of the respective aperture 324. In some aspects, the shoulder provides a friction fit with the apertures 324. The ICB cover 306 further includes indentations 326. Each of the indentations 326 includes an aperture configured to receive a respective one of the protrusions 311 therethrough. Beneficially, fastening the ICB cover 306 to the interconnect board 302, housing 202, or other component of the battery module 200 provides compressive engagement between the battery cell tabs 308, isolation sheet 312, and heat exchanger 314.

Figure 4:
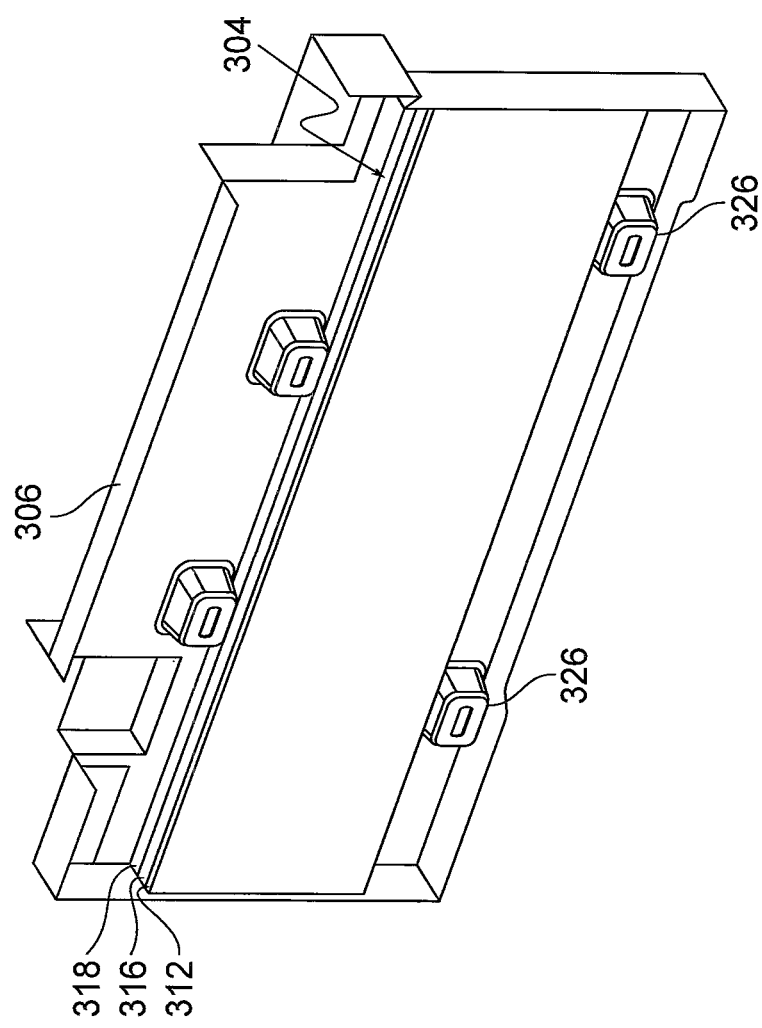
FIG. 4 is a schematic elevational view of cooling module and the ICB cover.

FIG. 4 illustrates a reverse perspective view of the cooling module 304 and the ICB cover 306. As can be seen, the indentations 326 are positioned to engage the cooling module 304 and thereby inhibit movement in at least one direction—e.g. laterally. Sides of the ICB cover 306 or additional indentations 326 may be used to engage the cooling module 304 and inhibit movement in at least an orthogonal direction—e.g., longitudinally. The cooling module 304 may be held in place along the two directions via a friction fit between the cooling module 304 and the ICB cover 306. Beneficially, engagement of the cooling module 304 with the protrusions and isolation of movement along the x and y axes, as well as compressive engagement with the battery cell tabs 308 helps optimize heat transfer by reducing boundary layers and materials, such as adhesives, that may inhibit heat transfer to the heat exchanger 314.

FIG. 5 is a cross-sectional view of a portion of the battery module 200. The battery pack 500 includes a plurality of cell pouches 502 with a plurality of cell-expansion foams 504 alternatingly positioned therebetween. For clarity of the drawing, an end of the battery pack 500 and interconnect board 302 is omitted from the drawing.

Each of the plurality of battery pouches 502 includes respective battery cell tabs 308 extending from at least one of the ends of the battery pouch 502. The battery cell tabs 308 include a first portion 506 extending from an end of the respective battery pouch 502 and a second portion 508 extending from the first portion 506 at a convex angle. In some aspects, the second portion 508 is perpendicular to the first portion 506.

The plurality of second portions 508 are generally aligned to share a common plane that is generally orthogonal to the longitudinal axis of the battery pouch 502. In some aspects, the common plane is coplanar with an outer surface of the interconnect board 302. For example, the first portion 506 of the battery cell tab 308 may correspond to and extend through an aperture of the interconnect board 302, and the second portion 508 may correspond to and reside within a respective channel of the interconnect board 302 configured to provide structural support to the second portion 508 upon compressive engagement with the isolation sheet 312. In some aspects, the second portion 508 is proud of the interconnect board 302 to promote intimate contact between the battery cell tabs 308 and the isolation sheet 312.

Figure 6:
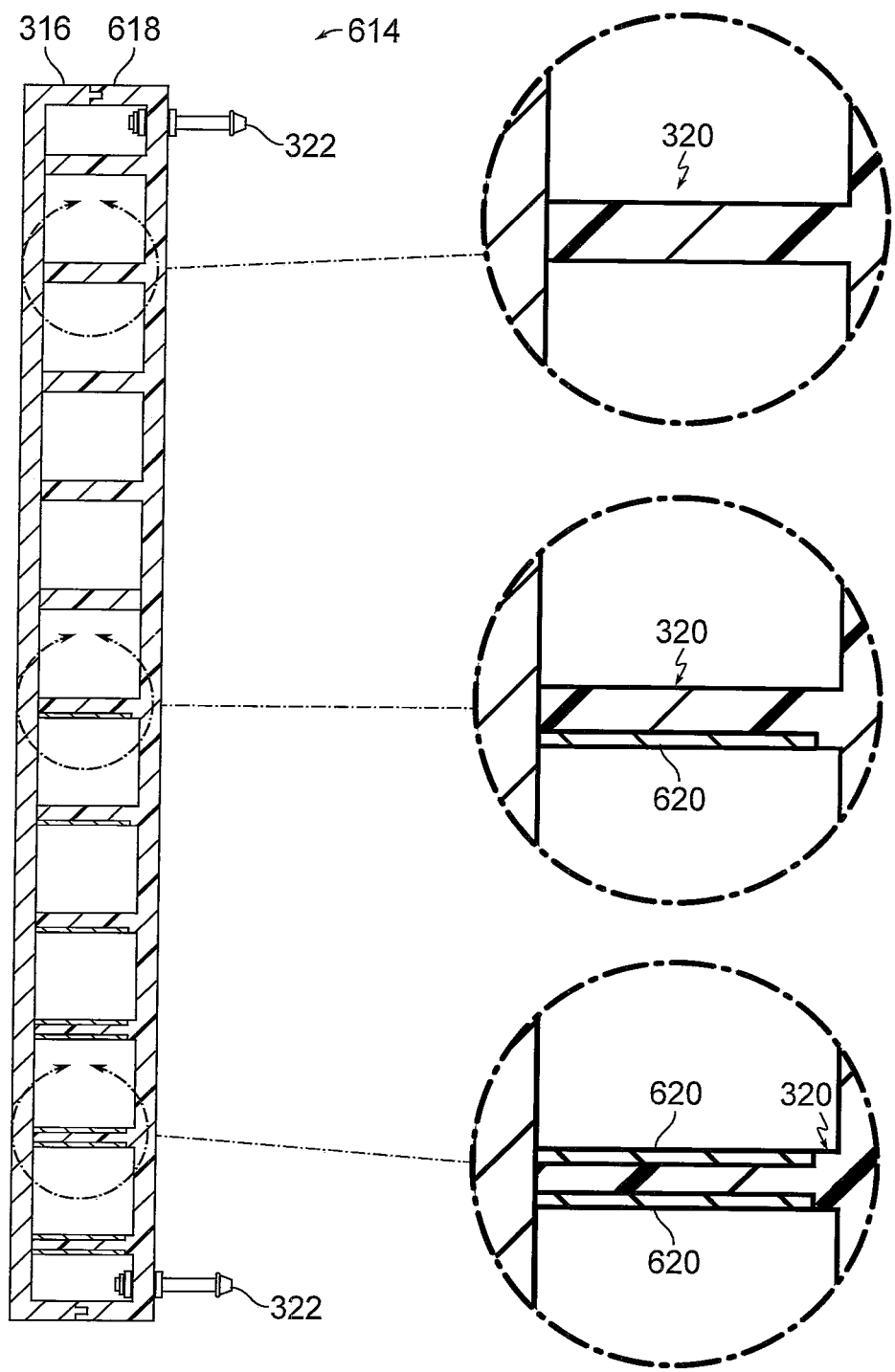
FIG. 6 is a cross-sectional schematic illustration of a heat exchanger, according to aspects of the present disclosure.

Referring now to FIG. 6, an example heat exchanger 614 is illustrated according to further aspects of the present disclosure. The heat exchanger 614 includes the metallic portion 316 and a lightweight portion 618. The lightweight portion 618 includes metallic members 620 selectively disposed within respective baffles 320. The metallic members 620 are generally disposed in baffles 320 that are more proximate the outlet nozzle 322 than the inlet nozzle 322.

The metallic members 620 have a higher thermal conductivity than the thermally conductive plastic material. Beneficially, the metallic members 620 increase heat transfer of the respective baffle 320 by effectively providing a larger surface area of contact between the thermally conductive plastic and the cooling fluid—e.g., because the metallic portion has a much greater thermal conductivity than the thermally conductive plastic, the effective cooling area of the thermally conductive plastic is the contacted perimeter of the metallic member 620 as opposed to the perimeter of the metallic member 620 contacting the cooling fluid. In some aspects, the metallic members 620 extend to and contact the metallic portion 316 to further optimize heat transfer from the battery cell tabs 308 to the cooling fluid by providing a thermal bridge between the metallic portion 316 and the baffles 320. Beneficially, by embedding the metallic members 620 into the thermally conductive plastic, overall weight to achieve a desired heat transfer may be further minimized because thickness of the metallic members 620 may be reduced. For example, the thermally conductive plastic portion of the baffle may be configured to withstand the forces imparted on the baffles 320 by the cooling fluid flow, and the metallic members 620 may still provide the desired heat transfer ability even though an equivalent unsupported member would be deformed by the fluid flow. The metallic members 620 may be embedded into the lightweight portion 318 by, for example, injection molding.

As understood by one of skill in the art, the present disclosure is susceptible to various modifications and alternative forms, and some representative embodiments have been shown by way of example in the drawings and described in detail above. It should be understood, however, that the novel aspects of this disclosure are not limited to the particular forms illustrated in the appended drawings. Rather, the disclosure is to cover all modifications, equivalents, combinations, sub-combinations, permutations, groupings, and alternatives falling within the scope and spirit of the disclosure and as defined by the appended claims.

As used herein, unless the context clearly dictates otherwise: the words "and" and "or" shall be both conjunctive and disjunctive, unless the context clearly dictates otherwise; the word "all" means "any and all"; the word "any" means "any and all"; the word "including" means "including without limitation"; and the singular forms "a", "an", and "the" includes the plural referents and vice versa.

Words of approximation, such as "approximately," "about," "substantially," and the like, may be used herein in the sense of "at, near, or nearly at," "within 0-10% of," or "within acceptable manufacturing tolerances," or a logical combination thereof, for example.

Numerical values of parameters (e.g., of quantities or conditions) in this specification, unless otherwise indicated expressly or clearly in view of the context, including the appended claims, are to be understood as being modified by the term "about" whether or not "about" actually appears before the numerical value. The numerical parameters set forth herein and in the attached claims are approximations that may vary depending upon the desired properties sought to be obtained by the present disclosure. At the very least, and not as an attempt to limit the application of the doctrine of equivalents to the scope of the claims, each numerical parameter should at least be construed in view of the number of reported significant digits and by applying ordinary rounding techniques.

While the metes and bounds of the term "about" are readily understood by one of ordinary skill in the art, the term "about" indicates that the stated numerical value or property allows imprecision. If the imprecision provided by "about" is not otherwise understood in the art with this ordinary meaning, then "about" indicates at least variations that may arise from ordinary methods of measuring and using such parameters. For example, if not otherwise understood in the art, the term "about" means within 10% (e.g., ±10%) of the stated value.

While the metes and bounds of the term "substantially" are readily understood by one of ordinary skill in the art, the term "substantially" indicates that the stated numerical value or property allows some imprecision. If the imprecision provided by "substantially" is not otherwise understood in the art with this ordinary meaning, then "substantially" indicates at least variations that may arise from manufacturing processes and measurement of such parameters. For example, if not otherwise understood in the art, the term "substantially" means within 5% (e.g., ±5%) of the stated value.

While the best modes for carrying out the disclosure have been described in detail, those familiar with the art to which this disclosure relates will recognize various alternative designs and embodiments for practicing the disclosure within the scope of the appended claims.

What is claimed is:

1. A cooling module comprising: an isolation sheet being generally prismatic with a first planar surface opposite a second planar surface, the first planar surface being configured to contact a plurality of battery cell tabs; and a heat exchanger configured to promote turbulent mixing of a cooling fluid and having a longitudinal axis and first and second opposing walls arranged along the longitudinal axis, the heat exchanger including: a cooling fluid inlet nozzle and a cooling fluid outlet nozzle disposed perpendicular to the longitudinal axis; a metallic portion defining an open cavity, the metallic portion having surface imperfections and including an outer planar surface engaging the second planar surface, and a lightweight portion having a first edge and a second edge spaced opposite the first edge, wherein the lightweight portion is joined to the metallic portion to define a unitary flow assembly, the lightweight portion being formed from a thermally conductive plastic material selected from the group consisting of a polyamide, a polycarbonate, and a polyphenylene sulfide, the lightweight portion including a plurality of baffles extending therefrom, the plurality of baffles being integrally formed with the lightweight portion, the plurality of baffles spaced apart from each other across the longitudinal axis and engaging an interior surface of the metallic portion to thereby define a serpentine path for the cooling fluid; wherein a first of the plurality of baffles abuts the first wall of the heat exchanger and extends laterally toward, but does not contact, the second wall of the heat exchanger opposite the first wall, while at least one of the plurality of baffles adjacent to the first baffle abuts the second wall and extends laterally toward, but does not contact, the first wall; wherein the metallic portion and the lightweight portion are directly bonded together at a lap joint in which the thermally conductive plastic material is disposed within the surface imperfections such that the heat exchanger is unitary and the lap joint is free from melted metal; wherein the heat exchanger is free from an adhesive disposed between the metallic portion and the lightweight portion; wherein respective ends of two or more of the plurality of baffles adjacent to the cooling fluid outlet nozzle are non-abutting such that a first mean residence time of the cooling fluid in the heat exchanger near the cooling fluid outlet nozzle is greater than a second mean residence time of the cooling fluid in the heat exchanger through the serpentine path; and respective ends of remaining ones of the plurality of baffles that are not adjacent to the cooling fluid outlet nozzle abut at least one of the first edge and the second edge of the lightweight portion such that the first mean residence time is greater than the second mean residence time.

2. The cooling module of claim 1, wherein the isolation sheet is formed from mica.

3. The cooling module of claim 1, wherein the heat exchanger includes a coolant fluid inlet and a coolant fluid outlet; and wherein the plurality of baffles includes a first baffle, a second baffle, and a third baffle each extending laterally through a center of the cavity, each of the first baffle, the second baffle, and the third baffle allow the cooling fluid to pass through gaps between both ends of the respective baffle and the first and second opposing walls of the heat exchanger corresponding to the respective baffle, the first baffle is disposed adjacent to the coolant fluid inlet, and the second baffle and the third baffle are disposed adjacent to the coolant fluid outlet.

4. The cooling module of claim 1, wherein the plurality of baffles provides structural support to the outer planar surface of the metallic portion.

5. The cooling module of claim 1, wherein the plurality of baffles includes a plurality of metallic members therein.

6. The cooling module of claim 5, wherein each of the metallic members compressively engages the metallic portion to form a thermal bridge therebetween.

7. The cooling module of claim 6, wherein the heat exchanger includes a cooling fluid inlet and a cooling fluid outlet; wherein the plurality of baffles includes a first set of baffles proximate to the cooling fluid inlet and a second set of baffles proximate to the cooling fluid outlet; and wherein the first set of baffles lacks metallic members and the second set of baffles includes the plurality of metallic members.

8. The cooling module of claim 1, wherein the heat exchanger includes a cooling fluid inlet and a cooling fluid outlet; wherein the plurality of baffles includes a first set of baffles proximate to the cooling fluid inlet, a second set of baffles proximate to the cooling fluid outlet, and a third set of baffles disposed therebetween; and wherein the first set of baffles lacks metallic members, each of the third set of baffles includes a respective metallic member having a first area exposed to the cooling fluid, and each of the second set of baffles includes a respective metallic member having a second area exposed to the cooling fluid, the second area being greater than the first area.

9. A battery module comprising: a battery pack including a plurality of battery pouches; a plurality of battery cell tabs, each of the battery pouches including a respective battery cell tab extending from an end thereof, the plurality of battery cell tabs defining a common plane; and a cooling module configured to directly cool the plurality of battery cell tabs, the cooling module including: an isolation sheet being generally prismatic with a first planar surface opposite a second planar surface, the first planar surface contacting the plurality of battery cell tabs along the common plane; and a heat exchanger configured to promote turbulent mixing of a cooling fluid and having a longitudinal axis and first and second opposing walls arranged along the longitudinal axis, the heat exchanger including: a cooling fluid inlet nozzle and a cooling fluid outlet nozzle disposed perpendicular to the longitudinal axis; a metallic portion defining an open cavity, the metallic portion having surface imperfections and including an outer planar surface engaging the second planar surface, and a lightweight portion having a first edge and a second edge spaced opposite from the first edge, wherein the lightweight portion is joined to the metallic portion to define a unitary flow assembly, the lightweight portion being formed from a thermally conductive plastic material selected from the group consisting of a polyamide, a polycarbonate, and a polyphenylene sulfide, the lightweight portion including a plurality of baffles extending therefrom, the plurality of baffles being integrally formed with the lightweight portion, the plurality of baffles spaced apart from each other across the longitudinal axis and engaging an interior surface of the metallic portion to thereby define a serpentine path for the cooling fluid; wherein a first of the plurality of baffles abuts the first wall of the heat exchanger and extends laterally toward, but does not contact, the second wall of the heat exchanger opposite the first wall, while at least one of the plurality of baffles adjacent to the first baffle abuts the second wall and extends laterally toward, but does not contact, the first wall; wherein the metallic portion and the lightweight portion are directly bonded together at a lap joint in which the thermally conductive plastic material is disposed within the surface imperfections such that the heat exchanger is unitary and the lap joint is free from melted metal; wherein the heat exchanger is free from an adhesive disposed between the metallic portion and the lightweight portion; wherein respective ends of two or more of the plurality of baffles adjacent to the cooling fluid outlet nozzle are non-abutting such that a first mean residence time of the cooling fluid in the heat exchanger near the cooling fluid outlet nozzle is greater than a second mean residence time of the cooling fluid in the heat exchanger through the serpentine path; and respective ends of remaining ones of the plurality of baffles that are not adjacent to the cooling fluid outlet nozzle abut at least one of the first edge and the second edge of the lightweight portion such that the first mean residence time is greater than the second mean residence time.

10. The battery module of claim 9, wherein the isolation sheet is formed from mica.

11. The battery module of claim 9, wherein adjacent ones of the plurality of baffles each include an extension attached to the plurality of baffles such that adjacent ones of the plurality of baffles are T-shaped; and adjacent extensions are spaced apart from each other across the longitudinal axis and overlap for a distance along the longitudinal axis.

12. The battery module of claim 9, wherein the plurality of baffles includes a plurality of metallic members therein, and wherein each of the metallic members compressively engages the metallic portion to form a thermal bridge therebetween.

13. The battery module of claim 12, wherein the heat exchanger includes a cooling fluid inlet and a cooling fluid outlet; wherein the plurality of baffles includes a first set of baffles proximate to the cooling fluid inlet and a second set of baffles proximate to the cooling fluid outlet; and wherein the first set of baffles lacks metallic members and the second set of baffles includes the plurality of metallic members.

14. The battery module of claim 9, wherein each battery cell tab includes a first portion extending through an interconnect board and a second portion at a convex angle to the first portion, the second portion of the battery cell tabs being supported by the interconnect board, and wherein the cooling module compressively engages the second portion of the battery cell tabs and the interconnect board.

15. The battery module of claim 14, further comprising an ICB cover defining an open cavity having the cooling module therein, the ICB cover configured to inhibit movement of the cooling module along two axes, the ICB cover configured to, upon a fastening engagement with the interconnect board, apply compressive force between the cooling module and the plurality of battery cell tabs.

16. The battery module of claim 15, wherein movement of the cooling module along the two axes is inhibited by a friction fit between the cooling module and the ICB cover.

17. The battery module of claim 15, wherein the ICB cover includes a plurality of indentations configured to inhibit movement of the cooling module along a first axis of the two axes.

18. The battery module of claim 17, wherein the indentations are further configured to receive a fastener therethrough to secure the ICB cover to the interconnect board.

19. The battery module of claim 18, wherein the fastener is a protrusion that is integrally formed with the interconnect board and includes a rotatable portion that is rotatable between a first orientation and a second orientation to engage the ICB cover and hold the ICB cover in place at the interconnect board.

20. The cooling module of claim 1, wherein: adjacent ones of the plurality of baffles each include an extension attached to the plurality of baffles such that adjacent ones of the plurality of baffles are T-shaped; and adjacent extensions are spaced apart from each other across the longitudinal axis and overlap for a distance along the longitudinal axis.

* * * * *